US012236759B2

(12) United States Patent
Schott et al.

(10) Patent No.: US 12,236,759 B2
(45) **Date of Patent: *Feb. 25, 2025**

(54) SYSTEMS AND METHODS FOR MANAGEMENT OF AUTOMATIC TELLER MACHINES

(71) Applicant: Capital One Services, LLC, McLean, VA (US)

(72) Inventors: Christopher Schott, Arlington, VA (US); Matthew Appleby, Washington, DC (US); Shay Cohen, Potomac, MD (US); Euihyun Hwang, Arlington, VA (US); Tyler Pilato, Reston, VA (US); Tabatha Seawell, McLean, VA (US); Arturo Urquiza, Arlington, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/497,256

(22) Filed: Oct. 30, 2023

(65) Prior Publication Data

US 2024/0062632 A1 Feb. 22, 2024

Related U.S. Application Data

(63) Continuation of application No. 17/731,221, filed on Apr. 27, 2022, now Pat. No. 11,804,111.

(51) Int. Cl.
*G07F 19/00* (2006.01)

(52) U.S. Cl.
CPC .......... *G07F 19/209* (2013.01); *G07F 19/206* (2013.01); *G07F 19/207* (2013.01); *G07F 19/211* (2013.01)

(58) Field of Classification Search
CPC .... G07F 19/209; G07F 19/206; G07F 19/207; G07F 19/211
(Continued)

(56) References Cited

U.S. PATENT DOCUMENTS 6,422,475 B1 7/2002 May
6,968,321 B1 11/2005 Yu
(Continued)

FOREIGN PATENT DOCUMENTS

CN 1280686 A 1/2001
CN 106991767 A 7/2017
(Continued)

OTHER PUBLICATIONS

Extended European Search Report in related EP Application No. EP22175184.5, mailed Oct. 13, 2022.
(Continued)

*Primary Examiner* — Daniel A Hess
(74) *Attorney, Agent, or Firm* — TROUTMAN PEPPER LOCKE LLP; Christopher J. Forstner; John A. Morrissett

(57) ABSTRACT

Disclosed herein are systems and methods of automated teller machine (ATM) management. The method can include receiving, from an ATM, an operating log from an out-of-band management chip. The method can further include determining, from the operating log, that the ATM is in an out-of-service state. The method can further include transmitting instructions to the out-of-band management chip to capture a system image of the ATM. In response, the method can include receiving the system image of the ATM from the out-of-band management chip and diagnosing a fault in the ATM based on the system image. The fault in the ATM can be the fault which caused the ATM to be in the out-of-service state. Finally, the method can include transmitting instructions for one or more corrective actions to the out-of-band
(Continued)

management chip. The corrective actions can remedy the fault in the ATM.

20 Claims, 4 Drawing Sheets

(58) Field of Classification Search
USPC .......................................................... 235/379
See application file for complete search history.

(56) References Cited

U.S. PATENT DOCUMENTS

| | | | |
|---|---|---|---|
| 7,284,694 | B2 | 10/2007 | Ferraro |
| 8,281,985 | B1 | 10/2012 | Steinmetz et al. |
| 8,312,212 | B2 | 11/2012 | Tolba |
| 8,474,704 | B1 | 7/2013 | Grimm et al. |
| 8,893,962 | B2 | 11/2014 | Ma et al. |
| 8,949,585 | B2 | 2/2015 | Hiltgen et al. |
| 9,015,129 | B2 | 4/2015 | Timashev et al. |
| 9,130,903 | B2 | 9/2015 | Ryman |
| 9,578,088 | B2 | 2/2017 | Nickolov et al. |
| 9,983,956 | B2 | 5/2018 | Munson et al. |
| 10,282,221 | B2 | 5/2019 | Arcese et al. |
| 10,360,010 | B1 | 7/2019 | Maehler et al. |
| 10,397,230 | B2 | 8/2019 | Callaghan et al. |
| 11,804,111 | B1 * | 10/2023 | Schott .................. G07F 19/207 |
| 2004/0215566 | A1 | 10/2004 | Meurer |
| 2008/0195540 | A1 | 8/2008 | Gee et al. |
| 2012/0194319 | A1 | 8/2012 | Kang et al. |
| 2012/0324278 | A1 | 12/2012 | Dent |
| 2015/0220381 | A1 | 8/2015 | Horgan |
| 2015/0248336 | A1 | 9/2015 | Han et al. |
| 2016/0103741 | A1 | 4/2016 | Kobres |
| 2017/0346851 | A1 | 11/2017 | Drake |
| 2018/0074886 | A1 | 3/2018 | Ewington et al. |
| 2018/0225459 | A1 | 8/2018 | Zarakas et al. |
| 2019/0371132 | A1 | 12/2019 | Hecker |
| 2019/0378101 | A1 | 12/2019 | Benkreira et al. |
| 2022/0374222 | A1 | 11/2022 | Reasor |

FOREIGN PATENT DOCUMENTS

| | | | |
|---|---|---|---|
| CN | 109785537 | A | 5/2019 |
| CN | 111080929 | A | 4/2020 |
| CN | 107133821 | B | 2/2021 |
| CN | 112784136 | A | 5/2021 |
| WO | 2018227772 | A1 | 12/2018 |
| WO | 2020041324 | A1 | 2/2020 |

OTHER PUBLICATIONS

Jepsen et al., "Linux Update: an Experimental ATM Network," 1999, IEEE (Year: 1999).
Leppakoski, "Life Cycle Management for Programmable Machine Control Platform," Feb. 2013, Tampere University of Technology.
Ahuja et al., "Generating Project Plans for Data Center Transformations," 2012, Springer-Verlag Berlin Heidelberg, pp. 767-778.
Toegl et al., "An approach to introducing locality in remote attestation using near field communications," Mar. 2019, Springer Science+ Business Media, LLC.

* cited by examiner

SYSTEMS AND METHODS FOR MANAGEMENT OF AUTOMATIC TELLER MACHINES

CROSS-REFERENCE TO RELATED APPLICATIONS

This application is a continuation of, and claims priority under 35 U.S.C. § 120 to, U.S. patent application Ser. No. 17/731,221, filed Apr. 27, 2022, the entire contents of which are fully incorporated herein by reference.

FIELD OF THE DISCLOSURE

Examples of the present disclosure relate generally to systems and methods for managing automatic teller machines (ATMs). Particularly, examples of the present disclosure relate to systems and methods for system imaging and out-of-band management for ATMs.

BACKGROUND

Automatic teller machines (ATMs) have become a ubiquitous part of everyday life. ATMs are widely used to make transactions with a variety of financial instruments because they often provide for quick, easy, and more convenient service than, for example, interaction at a bank with a teller. However, ATMs exist as very specialized machines, requiring dedicated service technicians to maintain proper service and keep the ATMs online. Should an ATM experience a significant error, the downtime of the ATM can be catastrophic. More often than not, broken ATMs must remain out of service until a dedicated service technician can physically attend to the ATM to bring the machine back online.

This same problem can arise during attempts to diagnose software problems on an ATM, such as an ATM operating system issues. Because ATMs exist as such specialized machines, current ATM environments lack the ability to recover a machine after an error. This means that if a failure occurs in the ATM software or the ATM is in an otherwise non-functional state, the machine must be manually imaged to be diagnosed, which can take several hours of downtime. Additionally, as stated above, providing a remedy for such problems can require a costly and time-consuming call to a dedicated service technician to manually image the machine, perform any software fixes, and/or bring the machine back online.

What is needed, therefore, are systems and methods that can image and diagnose ATMs remotely, implement one or more remedies to ATMs without a service technician, and bring non-functional ATMs back online. Examples of the present disclosure address this need as well as other needs that will become apparent upon reading the description below in conjunction with the drawings.

BRIEF SUMMARY

Examples of the present disclosure relate generally to systems and methods for managing automatic teller machines (ATMs). Particularly, examples of the present disclosure relate to systems and methods for system imaging and out-of-band management for ATMs.

Examples of the present disclosure can include a method of automated teller machine (ATM) management. The method can include receiving, from an ATM, an operating log from an out-of-band management chip. The method can further include determining, from the operating log, that the ATM is in an out-of-service state. The method can further include transmitting instructions to the out-of-band management chip to capture a system image of the ATM.

In response, the method can include receiving the system image of the ATM from the out-of-band management chip and diagnosing a fault in the ATM based on the system image. The fault in the ATM can be the fault which caused the ATM to be in the out-of-service state. Finally, the method can include transmitting instructions for one or more corrective actions to the out-of-band management chip. For example, the one or more corrective actions can include a software update, a user interface (UI) reboot, or a setting toggle for a program. The corrective actions can remedy the fault in the ATM.

Examples of the present disclosure can additionally include an ATM management system including a processor and a memory storing instructions to be executed by the processor. The instructions can cause the ATM management system to receive an operating log from an out-of-band management chip in an ATM and determine that the ATM is in an out-of-service state from the operating log.

The instructions can further cause the ATM management system to transmit instructions to the out-of-band management chip to capture a system image of the ATM. The instructions can then cause the ATM management system to receive the system image of the ATM from the out-of-band management chip and diagnose a fault in the ATM which caused the ATM to be in the out-of-service state. The fault can be diagnosed based on the system image. Finally, the instructions can cause the ATM management system to transmit instructions comprising one or more corrective actions to remedy the fault in the ATM. For example, the one or more corrective actions can include a software update, a user interface (UI) reboot, or a setting toggle for a program. The instructions can be transmitted and/or implemented by the out-of-band management chip.

Examples of the present disclosure can additionally include an ATM recovery system. The system can include a processor contained in an ATM, an out-of-band management chip in communication with the processor, a user interface (UI) in communication with the processor and the out-of-band management chip, an operating system implemented by the processor, and a memory storing instructions to be executed by the processor.

The instructions can cause the ATM recovery system to determine that the ATM is in an out-of-service state by the out-of-band management chip. The instructions can further cause the ATM recovery system to image the ATM to obtain a system image of the ATM which includes a screenshot of the UI and transmit the system image to a backend application programming interface (API) to be diagnosed to determine a fault. Finally, the instructions can cause the ATM recovery system to receive instructions comprising one or more corrective actions to remedy the fault in the ATM. For example, the one or more corrective actions can include a software update, a user interface (UI) reboot, or a setting toggle for a program. The instructions can be from the backend API and to the out-of-band management chip.

These and other aspects of the present disclosure are described in the Detailed Description below and the accompanying figures. Other aspects and features of examples of the present disclosure will become apparent to those of ordinary skill in the art upon reviewing the following description of specific, exemplary examples of the present disclosure in concert with the figures. While features of the present disclosure can be discussed relative to certain examples and figures, all examples of the present disclosure can include one or more of the features discussed herein. Further, while one or more examples can be discussed as having certain advantageous features, one or more of such features can also be used with the various examples of the disclosure discussed herein. In similar fashion, while exemplary examples can be discussed below as device, system, or method examples, it is to be understood that such exemplary examples can be implemented in various devices, systems, and methods of the present disclosure.

BRIEF DESCRIPTION OF THE DRAWINGS

The accompanying drawings, which are incorporated in and constitute a part of this specification, illustrate multiple examples of the presently disclosed subject matter and serve to explain the principles of the presently disclosed subject matter. The drawings are not intended to limit the scope of the presently disclosed subject matter in any manner.

DETAILED DESCRIPTION

Figure 1:
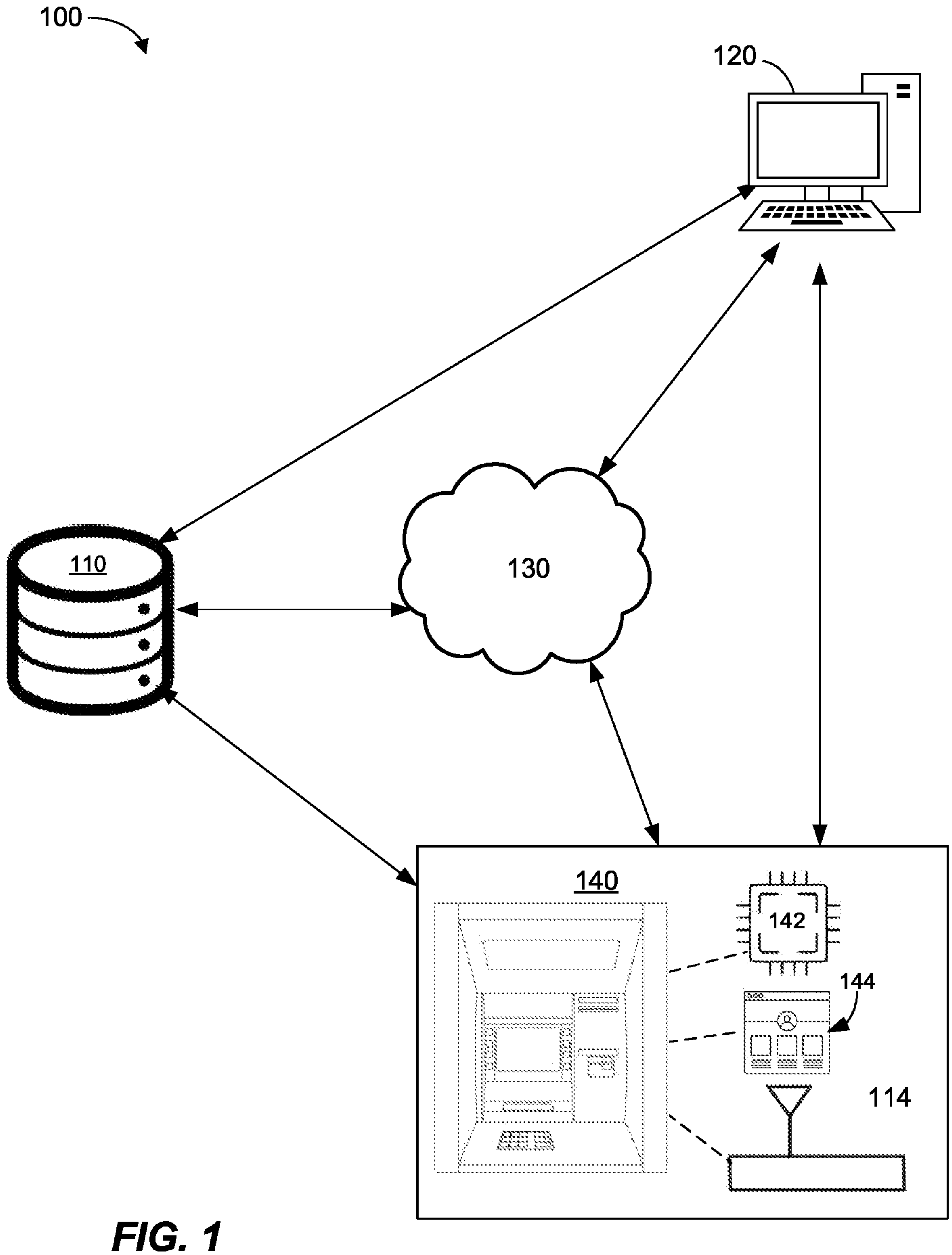
FIG. 1 illustrates a component diagram of an example of an automatic teller machine (ATM) management system according to some examples of the present disclosure.

As described above, a problem with current automatic teller machines (ATMs) is that broken ATMs must remain out of service until a dedicated service technician can physically attend to the ATM to bring the machine back online. Because ATMs exist as such specialized machines, current ATM diagnostic systems lack the ability to diagnose and/or remedy an ATM when an ATM goes down. This means that if an update deployment or other error in the ATM software leaves the machine in a non-functional state, the machine must be freshly imaged, which can take several hours of downtime.

Examples of the present disclosure can comprise systems and methods for ATM management and/or ATM recovery. When an ATM is out of service or non-functional, there can be an indication in the ATM's operating logs. The system can determine that the ATM has gone down by analyzing the operating logs. The system can instruct an out-of-band management chip to capture a system image of the current state of the ATM. Upon receiving the system image of the ATM, the system can analyze the system image to diagnose a fault in the ATM. Once the fault has been determined, the system can transmit one or more corrective actions to the ATM to remedy the fault.

The method can include receiving, from an ATM, an operating log from an out-of-band management chip. The method can further include determining, from the operating log, that the ATM is in an out-of-service state. The method can further include transmitting instructions to the out-of-band management chip to capture a system image of the ATM. In response, the method can include receiving the system image of the ATM from the out-of-band management chip and diagnosing a fault in the ATM based on the system image. The fault in the ATM can be the fault which caused the ATM to be in the out-of-service state. Finally, the method can include transmitting instructions for one or more corrective actions to the out-of-band management chip. For example, the one or more corrective actions can include a software update, a user interface (UI) reboot, or a setting toggle for a program. The corrective actions can remedy the fault in the ATM.

For ease of explanation, the systems and methods described herein are described with respect to an ATM. One of skill in the art will recognize, however, that the disclosure is not so limited and that the systems and methods could also be used on other applications. Instead of ATM, the system could be used in conjunction with, for example, self-checkout at grocery, and other, stores, vending machines of all sorts, currency exchange, ticket sales, etc. These, and other applications, are contemplated herein.

In addition, although certain embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. Other embodiments of the disclosure are capable of being practiced or carried out in various ways. Also, in describing the embodiments, specific terminology will be resorted to for the sake of clarity. It is intended that each term contemplates its broadest meaning as understood by those skilled in the art and includes all technical equivalents which operate in a similar manner to accomplish a similar purpose.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified.

The components described hereinafter as making up various elements of the disclosure are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

Reference will now be made in detail to exemplary examples of the disclosed technology, examples of which are illustrated in the accompanying drawings and disclosed herein. Wherever convenient, the same references numbers will be used throughout the drawings to refer to the same, or like, parts.

FIG. 1 illustrates another example of an ATM recovery system 100. The components and arrangements shown in FIG. 1 are not intended to limit the disclosed examples as the components used to implement the disclosed processes and features can vary. As shown, the ATM recovery system 100 can include an ATM 140. The ATM 140 can include one or more processors 142, a memory 114, and a graphical user interface (GUI) 144. The ATM 140 can include and/or communicate with a storage device 110. The components of the ATM recovery system 100 can also be configured to communicate via a network 130.

In some examples, the ATM recovery system 100 can include a computing device 120. The computing device 120 can be implemented by a financial institution, merchant, organization, or other such entity. The computing device 120 can also implement an ATM management system that can communicate with the storage device 110 and/or one or more external storage devices. The ATM management system can also be configured to communicate with directly with the ATM 140 as well as other components of the ATM recovery system 100. In some examples, the computing device 120 can be configured to package and/or push out updates to the ATM recovery system 100. The updates can be from the organization implementing the computing device 120. For example, the computing device 120 can update the ATM management system and push out the same update to the ATM 140 to update a client operating system on the ATM 140.

The computing device operating on the host operating system 120 can include one or more of a mobile device, smart phone, general purpose computer, tablet computer, laptop computer, telephone, a public switched telephone network (PSTN) landline, smart wearable device, voice command device, other mobile computing device, or any other device capable of communicating with a network and/or with one or more components of the ATM update system 100.

In some examples, the organization corresponding to the computing device 120 can be associated with, for example, a business, corporation, individual, partnership, or any entity that can provide financial services or processes financial transactions such as a bank, a credit card company, retailer, or the like. In some examples, the organization can provide goods and services. Although the organization is shown by the ATM management system 120 in FIG. 1, in some examples, some or all of the elements of the organization and the computing device 120 can be separate and/or separate entities used in conjunction with each other.

Figure 2:
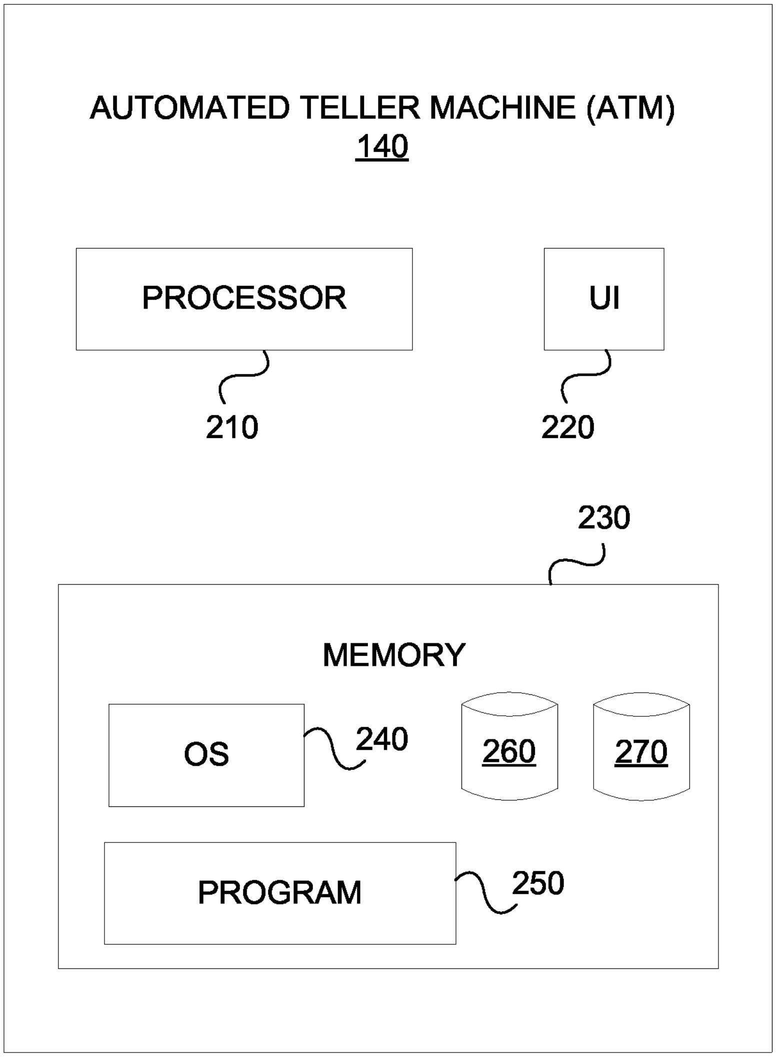
FIG. 2 illustrates a component diagram of an ATM used in an ATM update system according to some examples of the present disclosure.

An example of an ATM 140 is shown in more detail in FIG. 2. While FIG. 2 is illustrated and described with respect to the ATM 140, it is to be understood that the example of the ATM 140 is merely illustrative, and that the illustrations within FIG. 2 can comprise one or more additional components of the ATM 140 that would be understood by one of ordinary skill in the art.

As shown, the ATM 140 can include an out-of-band management chip 210; a user interface (UI) 220; a memory 230, which can contain a client operating system (OS) 240; a storage device 260, which can be any suitable repository of data; a program 250, which can include any programs suitable to operate the ATM 140; and a financial instrument storage 270. In some examples, the ATM 140 can also include a communication interface, such as a transceiver, to communicate with the network 130 and/or other components of the ATM recovery system 100. In some examples, the ATM 140 can further include a peripheral interface, a mobile network interface in communication with a processor, a bus configured to facilitate communication between the various components of the ATM 140, and/or a power source configured to power one or more components of the ATM 140. In certain examples, the ATM 140 can include a geographic location sensor (GLS) for determining the geographic location of the ATM 140.

The out-of-band management chip 210 can be, for example, an Intel active management technology (AMT) chip. The out-of-band management chip 210 can communicate with the computing device 120 and the database 110 over the network 130. The out-of-band management chip 210 can be remotely activated and/or instructed over the network 130 by any computing device (e.g., the computing device 120). The out-of-band management chip 210 can be able to function even if the ATM 140 is down or non-functional. In such a manner, the out-of-band management chip 210 can allow for communication over the network 130 even when the ATM 140 cannot. Therefore, the out-of-band management chip 210 can allow instructions to be transmitted to the ATM 140 and data to be transmitted out of the ATM 140.

The out-of-band management chip 210 can further include an application programming interface (API). The API can be configured to provide any and/or all of the functionalities of the out-of-band management chip 210 as described herein. The API can communicate with various components of the ATM 140 and the network 130.

Figure 3:
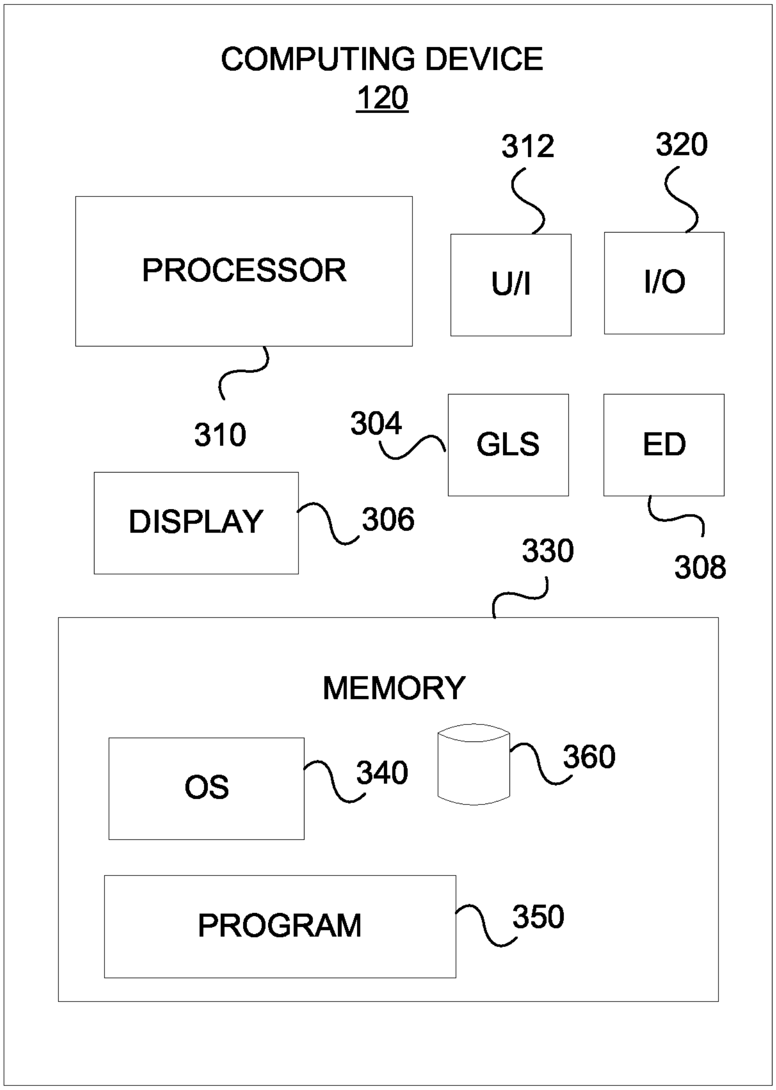
FIG. 3 illustrates a component diagram of an example of a computing device used in an ATM update system according to some examples of the present disclosure.

An example embodiment of a computing device 120 is shown in more detail in FIG. 3. While FIG. 3 is illustrated and described with respect to the computing device 120, it is to be understood that the example is merely illustrative, and that the illustrations within FIG. 3 can comprise one or more additional components of the ATM 140 that would be understood by one of ordinary skill in the art.

As shown, the ATM management system 120 (or computing device 120) can include a processor 310; an I/O device 320; a memory 330 containing an OS 340 (such as a host operating system); a storage device 360, which can be any suitable repository of data; and a program 350. In some examples, the computing device 120 can include components such as an accelerometer; a gyroscope; a GLS 304 for determining the geographic location of the computing device 120; a display 306 for displaying content such as text messages, images, and selectable buttons/icons/links; an environmental data ("ED") sensor 308 for obtaining environmental data including audio and/or visual information; a U/I device 312 for receiving user input data, such as data representative of a click, a scroll, a tap, a press, or typing on an input device that can detect tactile inputs; a display; a microphone and/or an image capture device, such as a digital camera. In some examples, the computing device 120 can include a transceiver to communicate with the network 130 and/or other components of the ATM recovery system 100. In some examples, the computing device 120 can further include a peripheral interface, a mobile network interface in communication with the processor 310, a bus configured to facilitate communication between the various components of the computing device 120, and/or a power source configured to power one or more components of the computing device 120.

The various components of the computing device 120 can include the same or similar attributes or capabilities of the same or similar components discussed with respect to the ATM 140. For example, the computing device 120 can include an API. The API can be configured to provide any and/or all of the functionalities of the computing device 120 as described herein. The API can communicate with various components of the computing device 120 and the network 130. Further, the API of the computing device 120 can communicate (e.g., call to) the API of the out-of-band management chip 210 in the ATM 140. In such a manner, the API can be used to execute various functionalities and programs remotely on the ATM 140.

While the following methods may be described with reference to the ATM recovery system 100, it is understood that one or more method steps or whole methods can be performed by other similar systems disclosed herein, other systems, general-purpose computers, computer operators, and the like.

Figure 4:
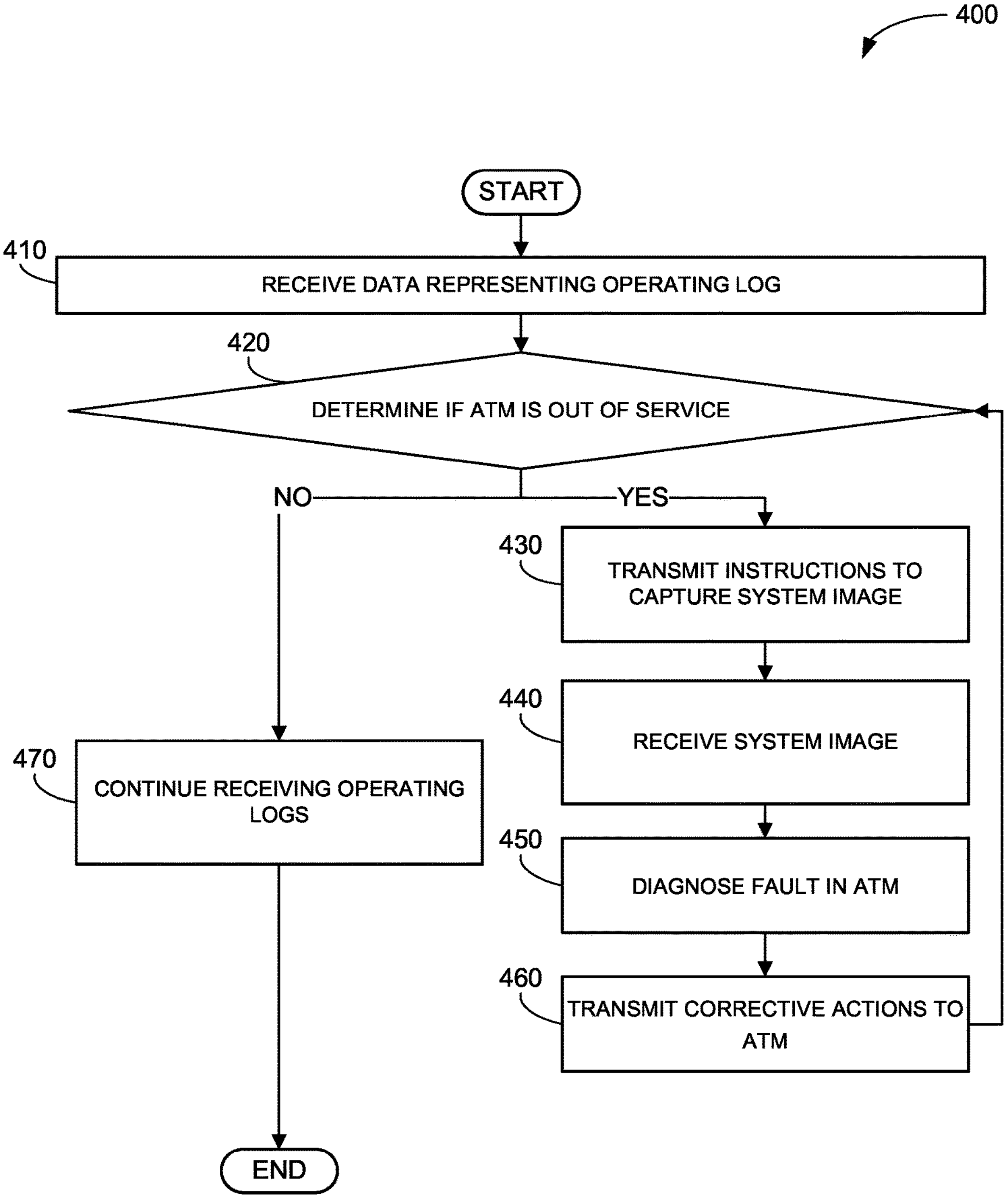
FIG. 4 illustrates a flowchart of an example method of ATM management according to some examples of the present disclosure.

FIG. 4 illustrates a flowchart of a method 400 of ATM management. It is understood that the ATM recovery system 100 can execute the method 400 on any components disclosed therein, such as the ATM management system 120.

As shown in block 410, the ATM recovery system 100 can receive data representing an operating log from the ATM 140. The operating log can comprise operating data from the ATM. The operating data can include metrics such as power consumption, network ping, uptime, cash reserve, network connectivity, operating system logs, activity data, and the like. The operating log can be transmitted over a network 130. Alternatively, or in addition, the operating log can be transmitted by an out-of-band management chip 210. The operating log can generally represent a current state of the ATM 140.

The operating log can further include a system image and/or a screenshot of the user interface 220. In such a manner, the system image can capture the state of the ATM 140 at a given point in time. The ATM recovery system 100 can further redact the screenshot to remove sensitive user information that was input at the ATM 140 and/or the user interface 220. In such a manner, a user's privacy can be protected, and the screenshot can be limited to only necessary information to diagnose the fault in the ATM. The ATM recovery system 100 can redact, for example, bank account information, credit card numbers, ATM PINs, and the like. The screenshot can also capture any error messages or display images on the UI 220. For example, an ATM 140 can display an "out-of-service" warning on the UI 220 to warn potential customers not to use the ATM 140. In another example, the ATM 140 can display a system fault message on the UI 220 to inform a service technician of the current fault that is causing the ATM 140 to be non-functional. The method 400 can then proceed on to block 420.

In block 420, the ATM recovery system 100 can determine if the ATM 140 is out of service. In other words, the ATM recovery system 100 can determine whether the ATM 140 is functional. The ATM recovery system 100 can make such a determination by analyzing the operating log. For example, the ATM recovery system 100 can utilize an algorithm or other form of neural network or artificial intelligence to parse the operating log to determine if the ATM 140 is operational or non-functional.

Alternatively, or in addition, the ATM recovery system 100 can analyze the system image and/or the screenshot of the UI 220 to determine if the ATM 140 is operation or non-functional. The screenshot of the UI 220 can be analyzed utilizing an algorithm or other form of neural network or artificial intelligence, which can in turn be trained using machine learning techniques to categorize different screenshots representing different states of the ATM 140. The screenshot can be categorized and stored in the database 110. In such a manner, the categorized screenshots can be used to train additional algorithms for diagnosing the ATM 140.

The screenshot can be analyzed along with other data received from the operating log. For example, the operating log can include audio and noise data from the ATM 140. The audio and noise data can include an error tone made by the ATM 140 (e.g., on the UI 220). Alternatively, the audio and noise data can include mechanical noise made by the ATM 140 (e.g., a motor on a cash dispenser makes a grinding noise). The audio and noise data can also be analyzed by the algorithms to determine or categorize the noise. The method 400 can then proceed on to block 430.

In block 430, the ATM recovery system 100 can transmit instructions to the ATM 140 to capture a system image of the ATM 140. The ATM recovery system 100 can transmit the instructions to the out-of-band management chip 210. The out-of-band management chip 210 can obtain the system image, which can include various types of data from the ATM 140. The system image can include, for example, BIOS data, power consumption, voltage data, network ping, uptime, cash reserve, network connectivity, activity data, and the like. Additionally, as described above, the system image can include a screenshot of the UI 220. The method 400 can then proceed on to block 440.

In block 440, the ATM recovery system 100 can receive the system image. The system image can be transmitted over a network, such as the network 130. Alternatively, or in addition, the system image can be stored in the database 110 prior to being received by the ATM recovery system 100. The ATM recovery system 100 can also retrieve the system image from the database 110. Furthermore, the out-of-band management chip 210 can transmit the system image to the ATM recovery system 100 and/or the database 110. The method 400 can then proceed on to block 450.

In block 540, the ATM recovery system 100 can diagnose a fault in the ATM 140. The ATM recovery system 100 can analyze the system image and/or the screenshot of the UI 220 to determine if the ATM 140 is operation or non-functional. The screenshot can also capture any error messages or display images on the UI 220. For example, an ATM 140 can display an "out-of-service" warning on the UI 220 to warn potential customers not to use the ATM 140. In another example, the ATM 140 can display a system fault message on the UI 220 to inform a service technician of the current fault that is causing the ATM 140 to be non-functional. The screenshot of the UI 220 can be analyzed utilizing an algorithm or other form of neural network or artificial intelligence, which can in turn be trained using machine learning techniques to categorize different screenshots representing different states of the ATM 140. The screenshot can be categorized and stored in the database 110. In such a manner, the categorized screenshots can be used to train additional algorithms for diagnosing the ATM 140.

As described above, the screenshot can be analyzed along with other data received from the operating log. For example, the operating log can include audio and noise data from the ATM 140. The audio and noise data can include an error tone made by the ATM 140 (e.g., on the UI 220). Alternatively, the audio and noise data can include mechanical noise made by the ATM 140 (e.g., a motor on a cash dispenser makes a grinding noise). The audio and noise data can also be analyzed by the algorithms to determine or categorize the noise. The method 400 can then proceed on to block 460.

In block 460, the ATM recovery system 100 can transmit instructions to the ATM 140 that include one or more corrective actions. The ATM recovery system 100 can transmit the corrective actions to the out-of-band management chip 210. The corrective actions can include, for example, rebooting the ATM 140, shutting down the ATM 140, defragmenting a storage device in the ATM 140, shutting off the UI 220, performing a factory reset, and the like. Additionally, the one or more corrective actions can include a software update, a user interface (UI) reboot, or a setting toggle for a program. Accordingly, the corrective actions can be selected and transmitted based on the diagnoses of the type of fault in the ATM 140. The method 400 can then proceed on to block 420 to once again determine if the ATM 140 is out of service or non-functional. If the ATM 140 is functional, the method can then proceed on to block 470. If the ATM 140 is non-functional, the method 400 can return to block 430.

In block 470, the ATM recovery system 100 can continue receiving operating logs from the ATM 140. The operating logs can be received from the out-of-band management chip 210 and/or retrieved from the database 110. In such a manner, the ATM recovery system 100 can continue monitoring the ATM 140. The method 400 can terminate after block 470. However, the method 400 can also proceed on to other method steps not shown.

While the present disclosure has been described in connection with a plurality of exemplary aspects, as illustrated in the various figures and discussed above, it is understood that other similar aspects can be used, or modifications and additions can be made, to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Additionally, it is understood that while the present disclosure is discussed with respect to automatic teller machines (ATMs), the present technology can be used in conjunction with other remote machines, systems, update networks, general purpose computers, computing devices, and the like without departing from the intended scope of the disclosure. Therefore, the present disclosure should not be limited to any single aspect, but rather construed in breadth and scope in accordance with the appended claims.

Exemplary Use Cases

The following exemplary use cases describe examples of a typical user flow pattern. They are intended solely for explanatory purposes and not limitation.

An automatic teller machine (ATM) can be in communication with a financial institution remotely over a network. Regularly, the financial institution can check the operating logs of the ATM by way of an ATM recovery system. The ATM recovery system can check the operating logs of the ATM continuously. If the ATM goes down or out of service, the ATM recovery system can see the indication in the operating logs. The operating logs can be continuously transmitted over the network or stored in a database from which the ATM recovery system can obtain operating logs in bulk.

The ATM recovery system can transmit instructions to the ATM by way of an out-of-band management chip in the ATM. The out-of-band management chip can be able to function even if the ATM is out of service. The instructions can tell the out-of-band management chip to capture a system image of the ATM which can include a screenshot of the ATM screen. The screenshot can include the error message displayed by the ATM along with an error code. The error message and error code can be associated with a specific kind of fault in the ATM.

The out-of-band management chip can transmit the system image and the screenshot to the ATM recovery system. The ATM recovery system can use a deep learning algorithm to analyze the screenshot. The ATM recovery system can categorize the screenshot and associated the screenshot with the kind of fault in the ATM. The ATM recovery system can therefore diagnose the fault in the ATM. The screenshot can be stored in a database and used for training other algorithms to diagnose the ATM faults.

The ATM recovery system can then transmit corrective actions to the ATM by way of the out-of-band management chip. The corrective action can be instructing the out-of-band management chip to perform a system reboot of the ATM. The corrective action can also instruct the out-of-band management chip to store the system image in the database as a backup in case of further ATM failure. Once rebooted, the ATM can then resume transmitting operating logs over the network to either the database or the ATM recovery system. In such a manner, the ATM recovery system can resume monitoring of the ATM to detect if additional faults are present.

What is claimed is:

1. A method of automated teller machine (ATM) management, the method comprising:

receiving, from an ATM, an operating log from an out-of-band management chip;

determining, from the operating log, that the ATM is in an out-of-service state;

transmitting instructions to the out-of-band management chip to capture a system image of the ATM;

receiving, from the out-of-band management chip, the system image of the ATM, the system image comprising system data indicating one or more error codes;

diagnosing, based on the one or more error codes, a fault in the ATM which caused the ATM to be in the out-of-service state; and transmitting, to the out-of-band management chip, instructions comprising one or more corrective actions to remedy the fault in the ATM.

2. The method of claim 1, wherein the one or more corrective actions comprise rebooting the ATM or shutting down the ATM.

3. The method of claim 1, wherein:

the system image further comprises a screenshot of a user interface (UI) of the ATM, and the system data comprises BIOS data, power consumption data, voltage data, network ping data, uptime data, cash reserve data, network connectivity data, activity data or combinations thereof.

4. The method of claim 3, further comprising: classifying the screenshot to categorize the fault in the ATM.

5. The method of claim 1, wherein the system image further comprises an audio file of a user interface (UI) of the ATM.

6. The method of claim 5, wherein:

the audio file further comprises an error tone, and the error tone is used to diagnose the fault in the ATM.

7. The method of claim 1, further comprising: prior to receiving the operating log, remotely activating the out-of-band management chip.

8. The method of claim 1, wherein the fault in the ATM comprises an operating system (OS) error such that the OS is unresponsive, and the out-of-band management chip remains operative in the ATM.

9. A terminal management system comprising:
a processor; and
a memory storing instructions that, when executed by the processor, cause the terminal management system to:
receive, from a terminal, an operating log from an out-of-band management chip;
determine, from the operating log, that the terminal is in an out-of-service state;
transmit instructions to the out-of-band management chip to capture a system image of the terminal;
receive, from the out-of-band management chip, the system image of the terminal, the system image comprising system data indicating one or more error codes;
diagnose, based on the one or more error codes found in the system image, a fault in the terminal which cause the terminal to be in the out-of-service state; and
transmit, to the out-of-band management chip, instructions comprising one or more corrective actions to remedy the fault in the terminal.

10. The system of claim 9, wherein the one or more corrective actions comprise rebooting the terminal or shutting down the terminal.

11. The system of claim 9, wherein:
the system image further comprises a screenshot of a user interface (UI) of the terminal, and
the system data comprises BIOS data, power consumption data, voltage data, network ping data, uptime data, cash reserve data, network connectivity data, activity data or combinations thereof.

12. The system of claim 11, further comprising: classifying the screenshot to categorize the fault in the terminal.

13. The system of claim 9, wherein the system image further comprises an audio file of a user interface (UI) of the terminal.

14. The system of claim 13, wherein:
the audio file further comprises an error tone, and
the error tone is used to diagnose the fault in the terminal.

15. The system of claim 9, further comprising: prior to receiving the operating log, remotely activating the out-of-band management chip.

16. The system of claim 9, wherein the fault in the terminal comprises an operating system (OS) error such that the OS is unresponsive, and the out-of-band management chip remains operative in the terminal.

17. An automated terminal recovery system, comprising:
a processor;
an out-of-band management chip in communication with the processor;
a user interface (UI) in communication with the processor and the out-of-band management chip;
an operating system implemented by the processor; and
a memory storing instructions that, when executed by the processor, cause the recovery system to:
determine, by the out-of-band management chip, that the terminal is in an out-of-service state;
image the terminal to obtain a system image of the terminal, the system image comprising system data indicating one or more error codes;
transmit, to a backend application programming interface (API), the system image of the terminal to be diagnosed to determine a fault based on the one or more error codes found in the system image; and
receive, from the backend API and by the out-of-band management chip, instructions comprising one or more corrective actions to remedy the fault in the terminal.

18. The system of claim 17, wherein the one or more corrective actions comprise rebooting the terminal or shutting down the terminal.

19. The system of claim 17, wherein:
the system image comprises a screenshot of the UI and an audio file of the UI of the terminal, and
the system data comprises BIOS data, power consumption data, voltage data, network ping data, uptime data, cash reserve data, network connectivity data, activity data or combinations thereof.

20. The system of claim 17, wherein the fault in the terminal comprises an OS error such that the OS is unresponsive, and the out-of-band management chip remains operative in the terminal.

* * * * *